United States Patent
Kim et al.

(10) Patent No.: US 12,509,397 B2
(45) Date of Patent: Dec. 30, 2025

(54) ARTIFICIAL MARBLE HAVING HIGH LIGHT TRANSMITTANCE

(71) Applicant: LX HAUSYS, LTD., Seoul (KR)

(72) Inventors: Donghee Kim, Seoul (KR); Hongkwan Cho, Seoul (KR); Yechan Kim, Seoul (KR); Hyewon Kim, Seoul (KR); Junyoung Seo, Seoul (KR)

(73) Assignee: LX HAUSYS, LTD., Seoul (KR)

( * ) Notice: Subject to any disclaimer, the term of this patent is extended or adjusted under 35 U.S.C. 154(b) by 0 days.

(21) Appl. No.: 18/250,235

(22) PCT Filed: Nov. 26, 2021

(86) PCT No.: PCT/KR2021/017683
§ 371 (c)(1),
(2) Date: Apr. 24, 2023

(87) PCT Pub. No.: WO2022/114870
PCT Pub. Date: Jun. 2, 2022

(65) Prior Publication Data
US 2023/0416149 A1      Dec. 28, 2023

(30) Foreign Application Priority Data

Nov. 27, 2020 (KR) .................. 10-2020-0163210

(51) Int. Cl.
*B32B 3/10* (2006.01)
*B44F 9/04* (2006.01)
(Continued)

(52) U.S. Cl.
CPC ............... *C04B 26/18* (2013.01); *B44F 9/04* (2013.01); *C04B 14/06* (2013.01); *C04B 14/22* (2013.01);
(Continued)

(58) Field of Classification Search
None
See application file for complete search history.

(56) References Cited

U.S. PATENT DOCUMENTS

| 5,935,617 A | 8/1999 | Uchida et al. |
| 7,700,682 B2 * | 4/2010 | Sekine .................... C03C 3/087 |
| | | 501/72 |

(Continued)

FOREIGN PATENT DOCUMENTS

| CN | 1371814 A | 10/2002 |
| CN | 1669755 A | 9/2005 |

(Continued)

OTHER PUBLICATIONS

Machine translation of KR-2001094571-A (Year: 2001).*
(Continued)

*Primary Examiner* — Christopher M Polley
(74) *Attorney, Agent, or Firm* — Birch, Stewart, Kolasch & Birch, LLP

(57) ABSTRACT

The present invention relates to an artificial marble having a total transmittance of 6 or greater and 20 or less when the total transmittance is measured using a turbidimeter (NDH 5000 available from Nippon Denshoku) for an artificial marble sample with a size of 7 cm in width, 7 cm in length, and 1.5 cm in thickness.

14 Claims, 2 Drawing Sheets

(51) Int. Cl.
*C04B 14/06* (2006.01)
*C04B 14/22* (2006.01)
*C04B 18/14* (2006.01)
*C04B 26/18* (2006.01)
*B28B 1/00* (2006.01)
*C04B 111/80* (2006.01)

(52) U.S. Cl.
CPC ............ *C04B 18/146* (2013.01); *B28B 1/005* (2013.01); *C04B 2111/805* (2013.01)

(56) References Cited

U.S. PATENT DOCUMENTS

| | | |
|---|---|---|
| 8,999,199 B2 | 4/2015 | Lee et al. |
| 9,029,436 B2 | 5/2015 | Hwang et al. |
| 2001/0006116 A1 | 7/2001 | Blazick et al. |
| 2010/0063193 A1 | 3/2010 | Cruz |
| 2011/0259222 A1 | 10/2011 | Tanaka et al. |
| 2012/0258290 A1 | 10/2012 | Kim et al. |
| 2013/0245156 A1 | 9/2013 | Buskila et al. |
| 2016/0221215 A1 | 8/2016 | Grzeskowiak et al. |
| 2018/0126673 A1 | 5/2018 | Sanchis Brines et al. |
| 2019/0283274 A1 | 9/2019 | Grzeskowiak, II et al. |
| 2021/0229313 A1 | 7/2021 | Rodriguez Garcia et al. |

FOREIGN PATENT DOCUMENTS

| | | | |
|---|---|---|---|
| CN | 1864969 A | | 11/2006 |
| CN | 101642929 A | | 2/2010 |
| CN | 102227312 A | | 10/2011 |
| CN | 102666123 A | | 9/2012 |
| CN | 105924034 A | | 9/2016 |
| CN | 106495564 A | | 3/2017 |
| CN | 107117868 A | | 9/2017 |
| CN | 107206835 A | | 9/2017 |
| CN | 109133721 A | | 1/2019 |
| CN | 111655438 A | | 9/2020 |
| EP | 0 483 028 A1 | | 4/1992 |
| EP | 0 790 221 A1 | | 8/1997 |
| EP | 0 790 222 A1 | | 8/1997 |
| JP | 6-48798 A | | 2/1994 |
| JP | 7-1418 A | | 1/1995 |
| JP | 2000-218605 A | | 8/2000 |
| JP | 2000-290052 A | | 10/2000 |
| JP | 2002-104857 A | | 4/2002 |
| JP | 2002-361646 A | | 12/2002 |
| JP | 2003-40663 A | | 2/2003 |
| JP | 2005132673 A | * | 5/2005 |
| JP | 2010-258326 A | | 11/2010 |
| JP | 2013-18199 A | | 1/2013 |
| KR | 10-0149842 | | 10/1998 |
| KR | 149842 B1 | * | 10/1998 |
| KR | 10-2001-0094571 A | | 11/2001 |
| KR | 2001094571 A | * | 11/2001 |
| KR | 10-2006-0083516 A | | 7/2006 |
| KR | 20-2009-0009240 U | | 9/2009 |
| KR | 10-2010-0106756 A | | 10/2010 |
| KR | 10-1049181 B1 | | 7/2011 |
| KR | 10-1270415 B1 | | 6/2013 |
| KR | 10-2013-0077142 A | | 7/2013 |
| KR | 10-1354654 B1 | | 1/2014 |
| KR | 10-2014-0080212 A | | 6/2014 |
| KR | 10-2018-0019602 A | | 2/2018 |
| KR | 10-2020-0028595 A | | 3/2020 |
| WO | WO 2007/145408 A1 | | 12/2007 |
| WO | WO 2009/044417 A1 | | 4/2009 |
| WO | WO 2020/147422 A1 | | 7/2020 |

OTHER PUBLICATIONS

Machine translation of KR-149842-B1 (Year: 1998).*
Machine translation of JP-2005132673-A (Year: 2008).*
International Search Report corresponding to International Application No. PCT/KR2021/017683, mailed Mar. 23, 2022 (5 pages, including English translation).
Extended European Search Report for European Application No. 21898695.8, dated Mar. 4, 2025.
U.S. Office Action for U.S. Appl. No. 18/250,367, dated Mar. 14, 2025.
US Office Action for U.S. Appl. No. 18/250,367, dated Sep. 4, 2024.
Extended European Search Report for European Application No. 21898691.7, dated Oct. 15, 2024.
Extended European Search Report for European Application No. 21898692.5, dated Oct. 15, 2024.
Partial Supplementary European Search Report for European Application No. 21898690.9, dated Oct. 14, 2024.
Partial Supplementary European Search Report for European Application No. 21898695.8, dated Oct. 16, 2024.
Chinese Office Action and Search Report for Chinese Application No. 202180076289.3, dated Jul. 28, 2025, with English translation of the Office Action.

* cited by examiner

[Figure 1]
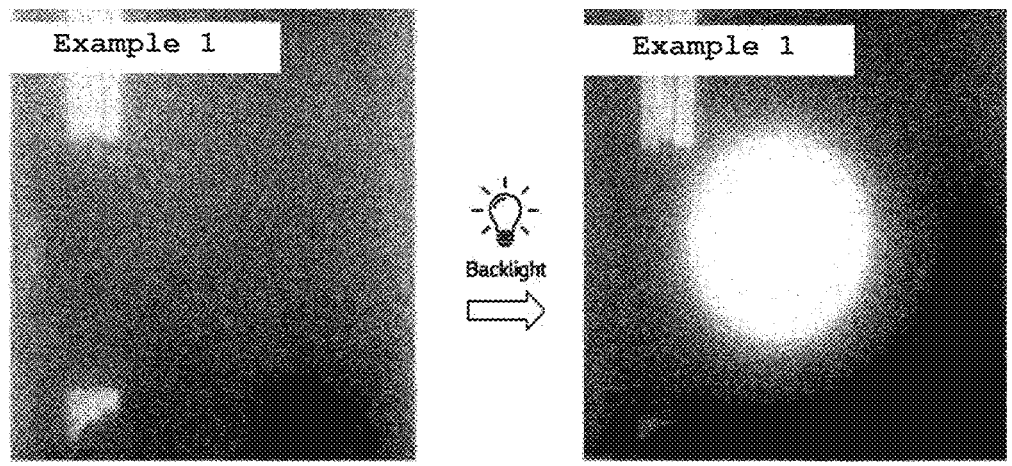
[Figure 2]
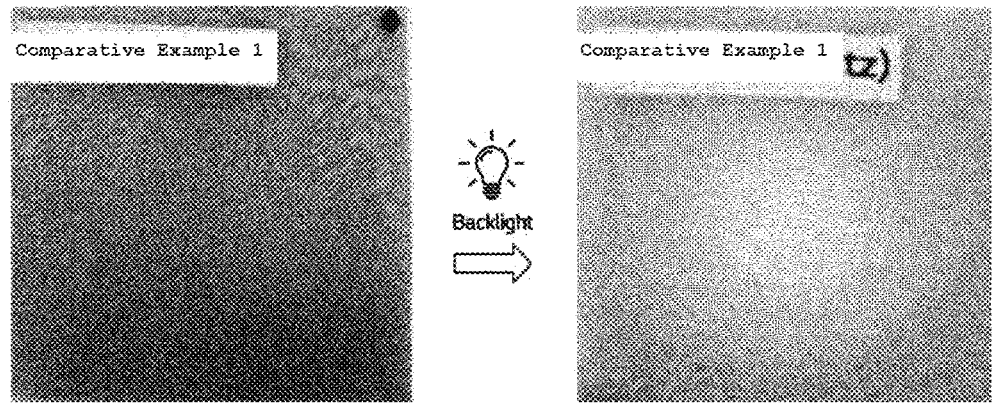

[Figure 3]
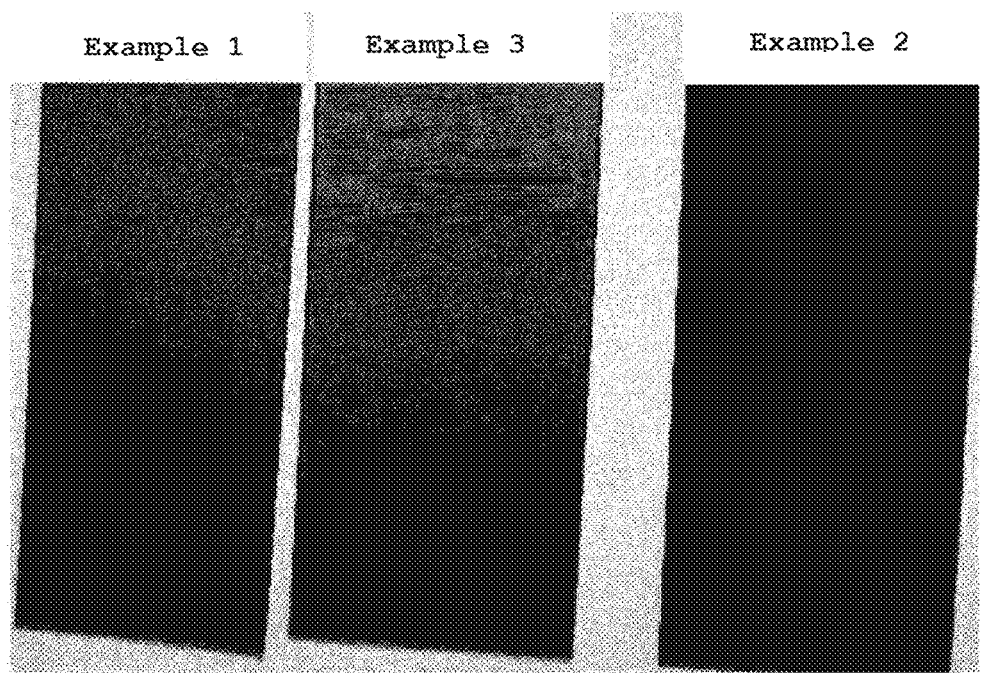

ARTIFICIAL MARBLE HAVING HIGH LIGHT TRANSMITTANCE

TECHNICAL FIELD

This application claims priority to and the benefit of Korean Patent Application No. 10-2020-0163210 filed in the Korean Intellectual Property Office on Nov. 27, 2020, the entire contents of which are incorporated herein by reference.

The present invention relates to an artificial marble having high light transmittance.

BACKGROUND ART

Engineered stone is artificial marble, also called E-stone, and is an interior design material that has a texture and feel similar to those of natural stone. In the industries, researches have been made to enhance an aesthetic sense by improving color-development, shape and the like of artificial marble. For example, Korean Patent No. 10-1270415 discloses an artificial marble with various patterns and appearances using marble chips. Demand for engineered stone is gradually increasing for interior floors, wall decorations, and kitchen worktops, and most of the products imitate natural stone species such as granite and marble.

However, in the recent interior design market, interest in quartzite with a more luxurious pattern is gradually increasing. Reflecting this trend, the E-stone industry is also making great effort to implement the corresponding stone species.

However, it is not easy to implement a natural quartzite design with the current E-stone production technology. It is difficult to implement engineered stones, which are similar to natural quartzites and transparent and have a visual sense of depth, by using colored pigments and opaque inorganic quartz particles that are widely used in the existing E-stone production process.

Accordingly, the present inventors have performed research on engineered stone that is similar to natural quartzites but has excellent light transmittance.

DETAILED DESCRIPTION OF THE INVENTION

Technical Problem

An object of the present invention is to provide an artificial marble that is similar to natural quartzites but has excellent light transmittance.

Technical Solution

In order to achieving the above object, an exemplary embodiment of the present invention provides an artificial marble having a total transmittance of 6 or greater and 20 or less when the total transmittance is measured using a turbidimeter (NDH 5000 available from Nippon Denshoku) for an artificial marble sample with a size of 7 cm in width, 7 cm in length, and 1.5 cm in thickness.

Another exemplary embodiment of the present invention provides the artificial marble having a luminance of 400 $cd/m^2$ or greater and 2000 $cd/m^2$ or less when an artificial marble sample with a size of 7 cm in width, 7 cm in length, and 1.5 cm in thickness is illuminated with 60 lumens of light from a backlight in contact with the artificial marble sample and the luminance is measured at a height of about 5 cm above a surface of the artificial marble sample by using a luminance meter (Luminance Meter LS-160 available from Konica Minolta), on a side of the artificial marble sample opposite to a side in contact with the backlight.

In an exemplary embodiment of the present invention, the artificial marble according to the above-described exemplary embodiments includes a binder resin, inorganic particles, and quartz powder, and the quartz powder has a $SiO_2$ content of 99.5 to 100% by weight and an alumina content of 0.5% by weight or less.

In an exemplary embodiment of the present invention, the inorganic particles included in the artificial marble according to the above-described exemplary embodiments includes one or more selected from the group consisting of amorphous silica particles, glass particles containing a barium element, crystalline quartz particles, and fused silica particles.

In an exemplary embodiment of the present invention, the artificial marble according to the above-described exemplary embodiments includes 500 to 700 parts by weight of the inorganic particles and 200 to 400 parts by weight of the quartz powder on the basis of 100 parts by weight of the binder resin.

In an exemplary embodiment of the present invention, the binder resin included in the artificial marble according to the above-described exemplary embodiments includes 90% by weight or more of an unsaturated polyester resin, and the unsaturated polyester resin is manufactured using a composition including an unsaturated polyester polymer and a vinyl-based monomer in a weight ratio of 100:30 to 70.

Advantageous Effects

The artificial marble of the present invention has a visual sense of depth and transparency, and has characteristics similar to those of natural quartzites when observed with the naked eye.

BRIEF DESCRIPTION OF DRAWINGS

FIG. 1 is a photograph showing what is seen from the front when an artificial marble sample of Example 1 is illuminated from behind with a backlight.

FIG. 2 is a photograph showing what is seen from the front when an artificial marble sample of Comparative Example 1 is illuminated from behind with a backlight.

FIG. 3 is an image showing X-ray scan results of artificial marble samples of Examples 1 to 3.

BEST MODE

An exemplary embodiment of the present invention provides an artificial marble having a total transmittance of 6 or greater and 20 or less when the total transmittance is measured using a turbidimeter (NDH 5000 available from Nippon Denshoku) for an artificial marble sample with a size of 7 cm in width, 7 cm in length, and 1.5 cm in thickness. In this case, the total transmittance is a sum of a diffusion transmittance and a parallel transmittance.

The artificial marble according to the exemplary embodiment has a visual sense of depth and transparency by having the total transmittance within the above-described range, and can exhibit characteristics similar to those of natural quartzites when observed with the naked eye.

The artificial marble may further have a luminance of 400 $cd/m^2$ or greater and 2000 $cd/m^2$ or less when an artificial marble sample with a size of 7 cm in width, 7 cm in length, and 1.5 cm in thickness is illuminated with 60 lumens of light from a backlight in contact with the artificial marble sample and the luminance is measured at a height of about 5 cm above a surface of the artificial marble sample by using a luminance meter (Luminance Meter LS-160 available from Konica Minolta), on a side of the artificial marble sample opposite to a side in contact with the backlight. The luminance is preferably 500 cd/m$^2$ or greater and 2000 cd/m$^2$ or less, more preferably 600 cd/m$^2$ or greater and 2000 cd/m$^2$ or less, even more preferably 700 cd/m$^2$ or greater and 2000 cd/m$^2$ or less, further even more preferably 800 cd/m$^2$ or greater and 2000 cd/m$^2$ or less, and most preferably 900 cd/m$^2$ or greater and 2000 cd/m$^2$ or less. For the backlight, a point light source, for example, a mobile phone backlight may be used.

According to an exemplary embodiment, the artificial marble includes a binder resin, inorganic particles, and quartz powder, and the quartz powder has a SiO$_2$ content of 99.5 to 100% by weight and an alumina content of 0.5% by weight or less. It is advantageous to achieve the above-described total transmittance and luminance when the quartz powder having the SiO$_2$ and alumina contents within the above ranges is used.

According to an exemplary embodiment, the inorganic particles included in the artificial marble include one or more selected from the group consisting of amorphous silica particles, glass particles containing a barium element, crystalline quartz particles, and fused silica particles.

Hereinafter the present invention will be described in detail.

Binder Resin

The artificial marble and/or the region of the artificial marble of the present invention includes a binder resin.

The binder resin is a binder resin including an unsaturated polyester (UPE) resin. The binder resin may include the unsaturated polyester resin in an amount of 90% by weight or more.

The binder resin may be manufactured by mixing, dispersing, and curing 0.4 to 2.5 parts by weight of a curing agent, 0.05 to 0.3 parts by weight of a catalyst, and 0.5 to 7 parts by weight of a coupling agent on the basis of 100 parts by weight of the unsaturated polyester resin.

The unsaturated polyester resin may be manufactured using a resin mixture including an unsaturated polyester polymer and a vinylic monomer. Preferably, the unsaturated polyester resin is manufactured using a composition including an unsaturated polyester polymer and a vinylic monomer in a weight ratio of 100:30 to 70. More preferably, the unsaturated polyester resin is manufactured using a composition including 60% by weight to 75% by weight of the unsaturated polyester polymer and 25% by weight to 40% by weight of the vinylic monomer.

The unsaturated polyester resin may be typically a viscous solution in which the unsaturated polyester polymer is diluted in the vinylic monomer. Therefore, when the content of the vinylic monomer is included within the range described above, the viscosity can be reduced, making it easier to handle the unsaturated polyester resin. Furthermore, the vinylic monomer can cure the unsaturated polyester resin from liquid to solid through cross-linking of polyester molecular chains without generating by-products. A weight-average molecular weight of the unsaturated polyester resin is 1,000 to 10,000 g/mol.

The unsaturated polyester polymer is not particularly limited, and examples thereof may include an unsaturated polyester polymer manufactured through a condensation reaction of a saturated or unsaturated dibasic acid and a polyhydric alcohol. Examples of the saturated or unsaturated dibasic acid may include ortho-phthalic acid, isophthalic acid, maleic anhydride, citraconic acid, fumaric acid, itaconic acid, phthalic acid, phthalic anhydride, terephthalic acid, succinic acid, adipic acid, sebacic acid or tetrahydrophthalic acid. In addition, examples of the polyhydric alcohol may include ethylene glycol, diethylene glycol, triethylene glycol, propylene glycol, dipropylene glycol, tripropylene glycol, polypropylene glycol, 1,3-butylene glycol, hydrogenated bisphenol A, trimethylolpropane monoaryl ether, neopentyl glycol, 2,2,4-trimethyl-1,3-pentadiol and/or glycerin. In addition, if necessary, a monobasic acid such as acrylic acid, propionic acid or benzoic acid, or a polybasic acid such as trimellitic acid or tetracarboxylic acid of benzol may be further used.

Examples of the type of vinylic monomer may include an alkyl acrylate monomer or an aromatic vinylic monomer. However, it is preferable to use an aromatic vinylic monomer in consideration of reactivity with the unsaturated polyester polymer. For example, as the aromatic vinylic monomer, one or more selected from the group consisting of styrene, α-methylstyrene, p-methylstyrene, vinyl toluene, alkyl styrene substituted with an alkyl group having 1 to 3 carbon atoms, and styrene substituted with a halogen may be used, and preferably, a styrene monomer may be used.

The curing agent may be included for a curing reaction of the binder, and is not particularly limited as long as a curing agent that is used when manufacturing engineered stone is used. The curing agent may be an organic peroxide-based compound or an azo-based compound. The organic peroxide-based compound may be one or two or more selected from a tert-butyl peroxybenzoate thermal curing agent (TBPB, Trigonox C, akzo nobel), diacyl peroxide, hydroperoxide, ketone peroxide, peroxy ester, peroxy ketal, dialkyl peroxide, alkyl perester, percarbonate, and peroxydicarbonate. For example, the compound may be tert-butyl peroxybenzoate thermal curing agent, benzoyl peroxide, dicumyl peroxide, butyl hydroperoxide, cumyl hydroperoxide, methyl ethyl ketone peroxide, t-butyl peroxy maleic acid, t-butyl hydroperoxide, acetyl peroxide, lauroyl peroxide, t-butyl peroxy neodecanoate, or t-amyl peroxy 2-ethyl hexanoate, but is not necessarily limited thereto.

In addition, the azo-based compound may be azobisisobutyronitrile, but is not necessarily limited thereto. The binder resin may include 0.4 to 2.5 parts by weight of the curing agent on the basis of 100 parts by weight of the unsaturated polyester resin. When the curing agent is included in an amount of 0.4 parts by weight or more, the binder resin can be sufficiently cured, and when the curing agent is included in an amount of 2.5 parts by weight or less, discoloration of the binder can be prevented.

The catalyst may be included for promoting curing of the binder at low temperature, and is not particularly limited as long as a catalyst that is used when manufacturing engineered stone is used. The catalyst may be one or two or more selected from cobalt-based, vanadium-based, or manganese-based metal soaps, tertiary amines, quaternary ammonium salts, and mercaptans. For example, a cobalt 6% catalyst (Hex-Cem, Borchers) may be used. The binder resin may include 0.05 to 0.3 parts by weight of the catalyst on the basis of 100 parts by weight of the unsaturated polyester resin. It is advantageous to promote curing when the catalyst is included in an amount of 0.05 parts by weight or more, and discoloration of the binder can be prevented when the catalyst is included in an amount of 0.3 parts by weight or less.

The coupling agent may be included to improve bonding force between the binder resin and inorganic particles such as natural mineral particles, and/or quartz powder, and may be a silane-based or silicate-based coupling agent. The binder resin may include 0.5 to 7 parts by weight of the coupling agent on the basis of 100 parts by weight of the unsaturated polyester resin. It is advantageous to improve bonding force with the inorganic particles and/or quartz powder when the coupling agent is included in an amount of 0.5 parts by weight or more, and it is advantageous to lower the cost of raw materials when it is included in an amount of 7 parts by weight or less.

Inorganic Particles

The artificial marble and/or the region of the artificial marble of the present invention includes inorganic particles. The inorganic particles of the present invention refer to inorganic particles with a particle size of 0.1 to 4 mm, and may be amorphous silica particles, glass particles, crystalline quartz particles, fused silica particles, or the like. In addition, the inorganic particles of the present invention may be one or more selected from the group consisting of amorphous silica particles, glass particles containing a barium element, and crystalline quartz particles. The particle size may be measured using a particle size analyzer (Beckman Coulter LS 13 320 particle size analyzer). Preferably, the inorganic particles of the present invention are amorphous silica particles, glass particles containing a barium element, and/or crystalline quartz particles having a $SiO_2$ content of 99.5% by weight or more and 100% by weight or less. More preferably, the inorganic particles of the present invention are amorphous silica particles, glass particles having a barium (Ba) element content of 10% by weight or more and 35% by weight or less in the particles, and/or crystalline quartz particles having a $SiO_2$ content of 99.5% by weight or more and 100% by weight or less. More preferably, the inorganic particles of the present invention are amorphous silica particles and glass particles having a barium (Ba) element content of 10% by weight or more and 35% by weight or less in the particles. An artificial marble manufactured using, as the inorganic particles of the present invention, amorphous silica particles or glass particles having a barium (Ba) element content of 10% by weight or more and 35% by weight or less in the particles has transparency higher than that of an artificial marble manufactured using, as the inorganic particles, crystalline quartz particles having a $SiO_2$ content of 99.5% by weight or more and 100% by weight or less. In addition, an artificial marble manufactured using, as the inorganic particles of the present invention, amorphous silica particles or glass particles having a barium (Ba) element content of 10% by weight or more and 35% by weight or less in the particles has luminance higher than that of an artificial marble manufactured using, as the inorganic particles, crystalline quartz particles having a $SiO_2$ content of 99.5% by weight or more and 100% by weight or less.

In the present specification, the expression described as "content in particles" is based on 100% by weight of particles. The glass particles may have a barium (Ba) element content of 10% by weight or more and 35% by weight or less, and more preferably 15% by weight or more and 25% by weight or less on the basis of 100% by weight of the glass particles. The content of the barium element included in the glass particles may be 5% by weight or more and 25% by weight or less, and more preferably 10% by weight or more and 15% by weight or less on the basis of 100% by weight of the artificial marble.

The inorganic particles of the present invention may be amorphous silica particles. Silica particles are a term commonly used in the field of artificial marble, and generally refer to $SiO_2$-based inorganic particles having a high $SiO_2$ content of 90% by weight or more, and including small amounts of other components such as minerals, in addition to $SiO_2$. The amorphous silica particles of the present invention may be amorphous fused silica particles, and the amorphous silica particles of the present invention may also be referred to as highly transparent amorphous fused silica particles. The amorphous fused silica particles may be amorphous fused silica particles having a particle size of 0.1 to 4 mm, and may have a $SiO_2$ content of 99.5 to 100% by weight, preferably 99.6 to 100% by weight, and more preferably 99.7 to 100% by weight, and an alumina content of 0.5% by weight or less, preferably 0.4% by weight or less, more preferably 0.3% by weight or less, and even more preferably 0.2% by weight or less. In addition, the amorphous fused silica particles may be amorphous fused silica particles having an average $SiO_2$ content of 99.5 to 100% by weight, preferably 99.6 to 100% by weight, and more preferably 99.7 to 100% by weight, and an average alumina content of 0.5% by weight or less, preferably 0.4% by weight or less, more preferably 0.3% by weight or less, and even more preferably 0.2% by weight or less. When the $SiO_2$ content in amorphous silica particles is 99.5% by weight or more, preferably 99.6% by weight or more, and more preferably 99.7% by weight or more, the transparency of the artificial marble is further improved.

The $SiO_2$ content of silica particles and quartz particles of the present invention can be confirmed by quantitatively analyzing the content with XRF (X-Ray Fluorescence spectroscopy). In addition, crystalline particles and amorphous particles can be confirmed by XRD (X-ray diffraction), and are generally confirmed by making the particles into pellets and measuring the same.

The inorganic particles of the present invention may be glass particles including a barium element. The glass particles of the present invention preferably have a barium (Ba) element content in the particle of 10% by weight or more and 35% by weight or less, and more preferably 15% by weight or more and 25% by weight or less.

Since glass is amorphous, the glass particles including the barium element of the present invention may also be referred to as highly transparent amorphous glass particles in the present specification. In this case, high transparency means that the transparency is 90% or greater and 100% or less, and means having a transmittance of 90% or greater in the visible ray region as measured by a UV/VIS spectrophotometer on a glass plate-shaped basis before being pulverized into particles.

The presence of the barium element content in the glass particles can be detected by X-ray scan The barium element content in the glass particles can be measured by XRF (X-Ray Fluorescence spectroscopy). The content of barium (Ba) element in the glass particles is preferably 10% by weight or more and 35% by weight or less, and more preferably 15% by weight or more and 25% by weight or less. Even when the barium element content deviates from the above range, the transparency of the glass particles themselves is good, but if an artificial marble is manufactured using the glass particles, the artificial marble may appear bluish or greenish (jade green) to the naked eye, making it unsuitable for use depending on the end use. That is, when the artificial marble is made using glass particles having a barium (Ba) element content of 10% by weight or more and 35% by weight or less, an artificial marble with good product quality and good color without bluish or greenish color can be manufactured.

The content of the barium element in the artificial marble can be confirmed as follows. When an artificial marble is manufactured using glass particles including a barium element, the barium element is included in the artificial marble. When the artificial marble including a certain amount or more of the barium element in this way is scanned using an X-ray, the artificial marble appears bluish in the X-ray photographed image. The barium element content in the glass particles can be measured by XRF (X-Ray Fluorescence spectroscopy).

Preferably, the glass particles of the present invention may be glass particles having a particle size of 0.1 to 4 mm, and may be highly transparent glass particles having a transmittance of 90% or greater in the visible ray region as measured by a UV/VIS spectrophotometer on a glass plate-shaped basis before being pulverized into particles.

The inorganic particles of the present invention may be crystalline quartz particles. The crystalline quartz particles of the present invention may also be referred to as highly transparent crystalline quartz particles in the present specification.

In this case, the crystalline quartz particles may be highly transparent crystalline quartz particles having a particles size of 0.1 to 4 mm, and having a $SiO_2$ content of 99.5 to 100% by weight, preferably 99.6 to 100% by weight, and more preferably 99.7 to 100% by weight, and an alumina content of 0.5% by weight or less, preferably 0.4% by weight or less, more preferably 0.3% by weight or less, and even more preferably 0.2% by weight or less. In addition, the crystalline quartz particles may be crystalline quartz particles having an average $SiO_2$ content of 99.5 to 100% by weight, preferably 99.6 to 100% by weight, and more preferably 99.7 to 100% by weight, and an average alumina content of 0.5% by weight or less, preferably 0.4% by weight or less, more preferably 0.3% by weight or less, and even more preferably 0.2% by weight or less.

When the $SiO_2$ content in the crystalline quartz particles is less than 99.5% by weight, for example, 99.4% by weight or less, the transparency of the artificial marble is lowered. Therefore, crystalline quartz particles having a $SiO_2$ content of 99.5% by weight or more are preferable.

Quartz Powder

The artificial marble and/or the region of the artificial marble of the present invention includes quartz powder. In this case, the quartz powder refers to quartz powder having a particle size of 0.1 mm or less. The particle size may be measured using a particle size analyzer (Beckman Coulter LS 13 320 particle size analyzer). The quartz powder of the present invention may also be referred to as highly transparent crystalline quartz powder in the present specification.

The quartz powder of the present invention is crystalline quartz powder, and is preferably crystalline quartz powder having a $SiO_2$ content of 99.5% by weight to 100% by weight. The quartz powder of the present invention may be quartz powder having a $SiO_2$ content of 99.5 to 100% by weight, preferably 99.6 to 100% by weight, and more preferably 99.7 to 100% by weight, and an alumina content of 0.5% by weight or less, preferably 0.4% by weight or less, more preferably 0.3% by weight or less, and even more preferably 0.2% by weight or less.

The quartz powder of the present invention may be quartz powder having an average $SiO_2$ content of 99.5 weight or more and 100% by weight or less, preferably 99.6 to 100% by weight, and more preferably 99.7 to 100% by weight, and an average alumina content of 0.5% by weight or less, preferably 0.4% by weight or less, more preferably 0.3% by weight or less, and even more preferably 0.2% by weight or less.

The $SiO_2$ content of the quartz powder of the present invention can be confirmed by quantitatively analyzing the content with XRF (X-Ray Fluorescence spectroscopy). In this case, the powder is generally made into pellets, which are then measured and confirmed with respect to the content.

Since the quartz powder has a small particle size, self-scattering occurs. Therefore, in order to increase the internal transmittance of the artificial marble, the artificial marble of the present invention includes crystalline quartz powder having a $SiO_2$ content of 99.5% by weight or more. If the $SiO_2$ content of the quartz powder is less than 99.5% by weight, the internal transmittance of the artificial marble is low, making it difficult to manufacture the artificial marble having high transparency intended by the present invention.

Artificial Marble

The artificial marble and/or an arbitrary region of the artificial marble of the present invention includes a binder resin, inorganic particles, and quartz powder.

Preferably, the artificial marble and/or an arbitrary region of the artificial marble of the present invention may include 500 to 700 parts by weight of inorganic particles and 200 to 400 parts by weight of quartz powder on the basis of 100 parts by weight of the binder resin, the binder resin may include an unsaturated polyester resin in an amount of 90% by weight or more, and the quartz powder may have a $SiO_2$ content of 99.5% to 100% by weight and an alumina content of 0.5% by weight or less.

In this case, 500 to 700 parts by weight, and preferably 550 to 650 parts by weight of the inorganic particles are included on the basis of 100 parts by weight of the binder resin. In this case, 200 to 400 parts by weight, and preferably 250 to 350 parts by weight of the quartz powder are included on the basis of 100 parts by weight of the binder resin.

In one aspect, the present invention relates to an artificial marble including 500 to 700 parts by weight, and preferably 550 to 650 parts by weight of inorganic particles and 200 to 400 parts by weight, and preferably 250 to 350 parts by weight of quartz powder on the basis of 100 parts by weight of a binder resin, in which the binder resin includes an unsaturated polyester resin, the unsaturated polyester resin includes an unsaturated polyester polymer and a vinyl-based monomer in a weight ratio of 100:30 to 70, and the quartz powder has a $SiO_2$ content of 99.5 to 100% by weight, preferably 99.6 to 100% by weight, and more preferably 99.7 to 100% by weight, and an alumina content of 0.5% by weight or less, preferably 0.4% by weight or less, more preferably 0.3% by weight or less, and even more preferably 0.2% by weight or less.

In one aspect, the present invention relates to an artificial marble including an arbitrary region including 500 to 700 parts by weight, and preferably 550 to 650 parts by weight of inorganic particles and 200 to 400 parts by weight, and preferably 250 to 350 parts by weight of quartz powder on the basis of 100 parts by weight of a binder resin, in which the binder resin includes an unsaturated polyester resin, the unsaturated polyester resin includes an unsaturated polyester polymer and a vinyl-based monomer in a weight ratio of 100:30 to 70, and the quartz powder has a $SiO_2$ content of 99.5 to 100% by weight, preferably 99.6 to 100% by weight, and more preferably 99.7 to 100% by weight, and an alumina content of 0.5% by weight or less, preferably 0.4% by weight or less, more preferably 0.3% by weight or less, and even more preferably 0.2% by weight or less.

More preferably, the present invention is an artificial marble including 500 to 700 parts by weight of highly transparent amorphous fused silica particles and 200 to 400 parts by weight of quartz powder containing $SiO_2$ of 99.5% by weight or more, on the basis of 100 parts by weight of a binder resin, and the transparency of the artificial marble is excellent.

Alternatively, more preferably, the present invention is an artificial marble including 500 to 700 parts by weight of glass particles containing a barium element of 10 to 35% by weight, and 200 to 400% by weight of quartz powder containing $SiO_2$ of 99.5% by weight or more, on the basis of 100 parts by weight of a binder resin, and the light transparency of the artificial marble is excellent.

Alternatively, preferably, the present invention is an artificial marble including 500 to 700 parts by weight of highly transparent crystalline quartz particles having a $SiO_2$ content of 99.5 to 100% by weight and an alumina content of 0.5% by weight or less, and 200 to 400 parts by weight of quartz powder containing a $SiO_2$ of 99.5% by weight or more on the basis of 100 parts by weight of a binder resin, and the transparency of the artificial marble is excellent.

The artificial marble may have a flexural strength of 30 to 100 MPa according to KS F 4739. The flexural strength means the maximum stress until the artificial marble is fractured by flexural load. Specifically, the artificial marble may have a flexural strength of 30 MPa to 100 MPa, or 50 MPa to 80 MPa. The artificial marble has the flexural strength within the range described above, and therefore, can be appropriately applied to exterior materials.

A scratch resistance of the artificial marble may be 0.8 to 2 N as measured by an Erichsen tester. When the scratch resistance is within the range described above, the artificial marble can be suitably used as an exterior material.

Water absorptance of the artificial marble may be 0.1% or less. The water absorptance may be measured according to the ASTM C97 standard. The artificial marble of the present invention has the water absorptance within the range described above, and therefore, can be applied to kitchen tops, outdoor building decoration materials, exterior materials and the like that are frequently exposed to moisture.

The artificial marble is an unsaturated polyester (UPE) artificial marble and is not an acrylic artificial marble. That is, although the artificial marble of the present invention may include a small amount of acrylic resin, acrylic monomer, or the like during manufacture, the artificial marble of the present invention is an unsaturated polyester (UPE) artificial marble and is not an acrylic artificial marble.

Manufacturing Method of Artificial Marble>

A manufacturing method of an artificial marble of the present invention includes mixing inorganic particles with a binder resin composition, mixing the mixture well, adding quartz powder to the mixture, and mixing well the same to manufacture an artificial marble composition; putting the artificial marble composition into a mold and performing vacuum vibration compression molding of compression molding the artificial marble composition with vacuum press equipment; curing the molded composition at 90° C. to 130° C. for 30 minutes to 1 hour, after the curing is completed, cooling the composition to room temperature (cooling), and then removing the same from the mold (mold release) to manufacture an artificial marble; and cutting the artificial marble and then performing post-processing of smoothly polishing surfaces thereof.

In this case, when mixing the inorganic particles with the binder resin composition, mixing the mixture well, adding the quartz powder to the mixture, and mixing well the same to manufacture an artificial marble composition, pigments and/or chips of one or more colors may be mixed together to manufacture the artificial marble composition. In addition, a first sub-artificial marble composition may be manufactured by mixing the inorganic particles with the binder resin composition, mixing the mixture well, and mixing quartz powder, a pigment and/or chips with the mixture, a second sub-artificial marble composition may be manufactured in the same way while using different types of a pigment and/or chip, and a plurality of, for example, two or more sub-artificial marble compositions are manufactured in a small amount in this way and then mixed to manufacture a final artificial marble composition for use. In this way, the artificial marble can be manufactured by a process including putting the final artificial marble composition into a mold and performing vacuum vibration compression molding of compression molding the artificial marble composition with vacuum press equipment; curing the molded composition at 90° C. to 130° C. for 30 minutes to 1 hour, after the curing is completed, cooling the composition to room temperature (cooling), and then removing the same from the mold (mold release) to manufacture an artificial marble; and cutting the manufactured artificial marble and then performing post-processing of smoothly polishing surfaces thereof. In this case, each of the sub-artificial marble compositions may include different pigments and/or chips, and addition amounts of each of the sub-artificial marble compositions used in the manufacture of the artificial marble may also be different. In addition, when manufacturing the final artificial marble composition by mixing a plurality of sub-artificial marble compositions, the mixing is preferably incompletely performed in such a manner that the sub-artificial marble compositions are not completely mixed with each other and the sub-artificial marble compositions remain lumped in places in the final artificial marble composition.

In this way, when the artificial marble is manufactured by incompletely mixing the plurality of sub-artificial marble compositions to manufacture the final artificial marble composition, the first-use sub-artificial marble compositions remain lumped in places in the artificial marble, which can be referred to as "regions" in the present invention. The presence of these regions gives the artificial marble a special aesthetic sense.

Region

The region may refer to an arbitrary three-dimensional part of the artificial marble. In addition, in the present invention, when the artificial marble is manufactured by using the plurality of sub-artificial marble compositions to manufacture the final artificial marble composition, the first-use sub-artificial marble compositions remain lumped in places in the artificial marble, which can be referred to as "regions" in the present invention.

The advantages and features of the present invention, and a method for achieving the same will become apparent with reference to Examples described in detail below. However, the present invention is not limited to Examples disclosed below, but can be implemented in a variety of different forms. The Examples are provided to only complete the disclosure of the present invention and to allow one skilled in the art to completely understand the category of the present invention. The present invention is only defined by the category of the claims.

<Materials and Methods>

For the highly transparent crystalline quartz particles, highly transparent crystalline quartz particles having a particle size of 0.1 to 2.5 mm were used. In addition, the highly transparent crystalline quartz particles are quartz having a SiO$_2$ content of 99.7% by weight or more and 100% by weight or less and a crystallinity of 100%.

For the highly transparent amorphous fused silica particles, highly transparent amorphous fused silica particles having a particle size of 0.1 to 2.5 mm were used. In addition, the highly transparent amorphous fused silica particles have a SiO$_2$ content of 99.7% by weight or more and 100% by weight or less, and an average SiO$_2$ content of 99.7% by weight.

For the highly transparent amorphous glass particles, highly transparent amorphous glass particles having a particle size of 0.1 to 2.5 mm in diameter were used. In addition, the highly transparent amorphous glass particles are glass particles having a transmittance of 90% or greater in the visible ray region as measured by a UV/VIS spectrophotometer on a glass plate-like basis before being pulverized into particles. In this test, highly transparent amorphous glass particles having a barium element content of 17% by weight and highly transparent amorphous glass particles containing no barium element were used.

For the highly transparent crystalline quartz powder, highly transparent crystalline quartz powder having a particle size of 0.1 mm or smaller in diameter was used. In addition, the highly transparent crystalline quartz powder has an alumina content of 0.5% by weight or less. In this experiment, several types of quartz powders were used according to the SiO$_2$ content.

That is, highly transparent crystalline quartz powder having a SiO$_2$ content of 99.7% by weight or more and 100% by weight or less and an average SiO$_2$ content of 99.7% by weight, highly transparent crystalline quartz powder having a SiO$_2$ content of 99.5% by weight or more and less than 99.7% by weight and an average SiO$_2$ content of 99.5% by weight, and transparent crystalline quartz powder having a SiO$_2$ content of 99.4% by weight or more and less than 99.5% by weight and an average SiO$_2$ content of 99.4% by weight were used.

The opaque crystalline quartz particles used in Comparative Examples were particles generally used in the field of artificial marble, preferably E-stone, and opaque crystalline quartz particles having a particle size of 0.1 to 2.5 mm were used. In addition, the opaque crystalline quartz particles have a SiO$_2$ content of 99.2% by weight or more and 99.4% by weight or less, and an average SiO$_2$ content of 99.2% by weight.

For the opaque crystalline quartz powder, opaque crystalline quartz powder having a particle size of 0.1 mm or less was used. In addition, for the opaque crystalline quartz powder, opaque crystalline quartz powder having a SiO$_2$ content of 99% by weight or more and less than 99.4% by weight, and an average SiO$_2$ content of 99.2% by weight was used.

The binder resin composition was manufactured as follows. An unsaturated polyester resin in which an unsaturated polyester polymer obtained by polycondensation of orthophthalic acid with a polyhydric alcohol and a styrene monomer were used in a weight ratio of 65:35 was used. Then, a binder resin composition was manufactured by mixing and dispersing 1.5 parts by weight of a tert-butyl peroxybenzoate thermal curing agent (TBPB, Trigonox C, akzo nobel) serving as a curing agent, 0.1 parts by weight of a cobalt 6% catalyst (Hex-Cem, Borchers) serving as a catalyst and 3 parts by weight of a silane-based coupling agent on the basis of 100 parts by weight of the unsaturated polyester resin.

The light transmittance measurement method of the artificial marble sample is as follows. A turbidimeter (NDH 5000 manufactured by Nippon Denshoku Co., Ltd.) was used as the equipment used. As the artificial marble sample, a sample having a width of 7 cm, a length of 7 cm, and a thickness of 1.5 cm was used, and the total transmittance was measured. In this case, the total transmittance is a sum of a diffusion transmittance and a parallel transmittance.

Example 1

The highly transparent amorphous fused silica particles were added and mixed well in the binder resin composition by using the planetary mixer. Then, the highly transparent crystalline quartz powder was added and mixed well in the mixture to manufacture an artificial marble composition. The artificial marble composition was put into a rubber mold and compression molded using vacuum press equipment. Then, the molded composition was cured at 120° C. for 1 hour, and after the curing was completed, the cured composition was cooled to room temperature, and then taken out of the mold to manufacture an artificial marble. After cutting the artificial marble on all sides, the surfaces were polished smoothly to manufacture an artificial marble sample.

In this case, 600 parts by weight of the highly transparent amorphous fused silica particles having an average SiO$_2$ content of 99.7% by weight, and 300 parts by weight of the highly transparent crystalline quartz powder having an average SiO$_2$ content of 99.7% by weight were used on the basis of 100 parts by weight of the binder resin composition.

Example 2

An artificial marble sample was manufactured in the same manner as in Example 1, except that highly transparent amorphous glass particles having a barium element content of 17% by weight were used instead of the highly transparent amorphous fused silica particles in Example 1.

Example 3

An artificial marble sample was manufactured in the same manner as in Example 1, except that highly transparent crystalline quartz particles having an average SiO$_2$ content of 99.7% by weight were used instead of the highly transparent amorphous fused silica particles in Example 1.

Example 4

An artificial marble sample was manufactured in the same manner as in Example 1, except that highly transparent crystalline quartz powder having a SiO$_2$ content of 99.5% by weight were used instead of the highly transparent crystalline quartz powder having an average SiO$_2$ content of 99.7% by weight in Example 1.

Example 5

An artificial marble sample was manufactured in the same manner as in Example 1, except that highly transparent crystalline quartz powder having a SiO$_2$ content of 99.5% by weight were used instead of the highly transparent crystalline quartz powder having an average SiO$_2$ content of 99.7% by weight in Example 2.

Example 6

An artificial marble sample was manufactured in the same manner as in Example 1, except that highly transparent crystalline quartz powder having an average SiO$_2$ content of 99.5% by weight were used instead of the highly transparent crystalline quartz powder having an average $SiO_2$ content of 99.7% by weight in Example 3.

Comparative Example 1

An artificial marble sample was manufactured in the same manner as in Example 1, except that transparent crystalline quartz powder having an average $SiO_2$ content of 99.4% by weight were used instead of the highly transparent crystalline quartz powder having an average $SiO_2$ content of 99.7% by weight in Example 1.

Comparative Example 2

An artificial marble sample was manufactured in the same manner as in Comparative Example 1, except that highly transparent amorphous glass particles having a barium element content of 17% by weight were used instead of the highly transparent amorphous fused silica particles in Comparative Example 1.

Comparative Example 3

An artificial marble sample was manufactured in the same manner as in Comparative Example 1, except that highly transparent crystalline quartz particles having an average $SiO_2$ content of 99.7% by weight were used instead of the highly transparent amorphous fused silica particles in Comparative Example 1.

Comparative Example 4

An artificial marble sample was manufactured in the same manner as in Comparative Example 1, except that opaque crystalline quartz powder having an average $SiO_2$ content of 99.2% by weight was used instead of the highly transparent crystalline quartz powder in Comparative Example 1.

Comparative Example 5

An artificial marble sample was manufactured in the same manner as in Comparative Example 2, except that opaque crystalline quartz powder having an average $SiO_2$ content of 99.2% by weight was used instead of the highly transparent crystalline quartz powder in Comparative Example 2.

Comparative Example 6

An artificial marble sample was manufactured in the same manner as in Comparative Example 3, except that opaque crystalline quartz powder having an average $SiO_2$ content of 99.2% by weight was used instead of the highly transparent crystalline quartz powder in Comparative Example 3.

Example 7

An artificial marble sample was manufactured in the same manner as in Example 1, except that highly transparent amorphous glass particles not containing a barium element were used instead of the highly transparent amorphous fused silica particles in Example 1.

Example 8

An artificial marble sample was manufactured in the same manner as in Example 7, except that highly transparent crystalline quartz powder having an average $SiO_2$ content of 99.5% by weight were used instead of the highly transparent crystalline quartz powder having an average $SiO_2$ content of 99.7% by weight in Comparative Example 7.

Comparative Example 7

An artificial marble sample was manufactured in the same manner as in Example 7, except that transparent crystalline quartz powder having an average $SiO_2$ content of 99.4% by weight were used instead of the highly transparent crystalline quartz powder having an average $SiO_2$ content of 99.7% by weight in Example 7.

Comparative Example 8

An artificial marble sample was manufactured in the same manner as in Example 7, except that opaque crystalline quartz powder having an average $SiO_2$ content of 99.2% by weight were used instead of the highly transparent crystalline quartz powder having an average $SiO_2$ content of 99.7% by weight in Example 7.

Comparative Example 9

An artificial marble sample was manufactured in the same manner as in Example 1, except that opaque crystalline quartz particles having an average $SiO_2$ content of 99.2% by weight were used instead of the highly transparent amorphous fused silica particles in Example 1.

Comparative Example 10

An artificial marble sample was manufactured in the same manner as in Comparative Example 9, except that highly transparent crystalline quartz powder having an average $SiO_2$ content of 99.5% by weight were used instead of the highly transparent crystalline quartz powder having an average $SiO_2$ content of 99.7% by weight in Comparative Example 9.

Comparative Example 11

An artificial marble sample was manufactured in the same manner as in Comparative Example 9, except that transparent crystalline quartz powder having an average $SiO_2$ content of 99.4% by weight were used instead of the highly transparent crystalline quartz powder having an average $SiO_2$ content of 99.7% by weight in Comparative Example 9.

Comparative Example 12

An artificial marble sample was manufactured in the same manner as in Comparative Example 9, except that opaque crystalline quartz powder having an average $SiO_2$ content of 99.2% by weight were used instead of the highly transparent crystalline quartz powder having an average $SiO_2$ content of 99.7% by weight in Comparative Example 9.

That is, the weight ratios of the materials used for the artificial marble samples in Examples 1 to 8 and Comparative Examples 1 to 12 are as follows (Table 1). In Table 1, the $SiO_2$ content is an average value of $SiO_2$ contents in particles or powder.

TABLE 1

| | Binder resin composition | Inorganic particles | | | | | Powder | | | |
|---|---|---|---|---|---|---|---|---|---|---|
| | | Highly transparent amorphous fused silica particles ($SiO_2$, 99.7%) | Highly transparent amorphous glass particles (Ba element of 17% by weight) | Highly transparent amorphous glass particles (not containing Ba element) | Highly transparent crystalline quartz particles ($SiO_2$, 99.7%) | Opaque crystalline quartz particles ($SiO_2$, 99.2%) | Highly transparent crystalline quartz powder ($SiO_2$, 99.7%) | Highly transparent crystalline quartz powder ($SiO_2$, 99.5%) | Transparent crystalline quartz powder ($SiO_2$, 99.4%) | Opaque crystalline quartz powder ($SiO_2$, 99.2%) |
| Example 1 | To 100 | 600 | | | | | 300 | | | |
| Example 2 | To 100 | | 600 | | | | 300 | | | |
| Example 3 | To 100 | | | | 600 | | 300 | | | |
| Example 4 | To 100 | 600 | | | | | | 300 | | |
| Example 5 | To 100 | | 600 | | | | | 300 | | |
| Example 6 | To 100 | | | | 600 | | | 300 | | |
| Comparative Example 1 | To 100 | 600 | | | | | | | 300 | |
| Comparative Example 2 | To 100 | | 600 | | | | | | 300 | |
| Comparative Example 3 | To 100 | | | | 600 | | | | 300 | |
| Comparative Example 4 | To 100 | 600 | | | | | | | | 300 |
| Comparative Example 5 | To 100 | | 600 | | | | | | | 300 |
| Comparative Example 6 | To 100 | | | | 600 | | | | | 300 |
| Example 7 | To 100 | | | 600 | | | 300 | | | |
| Example 8 | To 100 | | | 600 | | | | 300 | | |
| Comparative Example 7 | To 100 | | | 600 | | | | | 300 | |
| Comparative Example 8 | To 100 | | | 600 | | | | | | 300 |
| Comparative Example 9 | To 100 | | | | | 600 | 300 | | | |
| Comparative Example 10 | To 100 | | | | | 600 | | 300 | | |
| Comparative Example 11 | To 100 | | | | | 600 | | | 300 | |
| Comparative Example 12 | To 100 | | | | | 600 | | | | 300 |

Experimental Example 1

For the artificial marble samples of Examples 1 to 6 and Comparative Examples 1 to 12, the light transmittance was measured using the turbidimeter (NDH 5000 available from Nippon Denshoku). As a result, all of the artificial marble samples of Examples 1 to 6 showed excellent total transmittance, exceeding 6.00%. However, all of the Comparative Examples showed low total transmittance, and the artificial marbles of Examples 7 and 8 appeared greenish or bluish, and therefore, showed a relatively low product quality (Table 2).

TABLE 2

| | Total transmittance (%) |
|---|---|
| Example 1 | 8.09 |
| Example 2 | 12.79 |
| Example 3 | 7.56 |
| Example 4 | 6.99 |
| Example 5 | 10.17 |
| Example 6 | 7.02 |
| Comparative Example 1 | 4.88 |
| Comparative Example 2 | 5.02 |
| Comparative Example 3 | 3.51 |
| Comparative Example 4 | 4.37 |
| Comparative Example 5 | 4.75 |
| Comparative Example 6 | 3.19 |
| Example 7 | 7.09 |
| Example 8 | 6.11 |
| Comparative Example 7 | 4.33 |
| Comparative Example 8 | 4.24 |
| Comparative Example 9 | 3.88 |
| Comparative Example 10 | 3.11 |
| Comparative Example 11 | 2.24 |
| Comparative Example 12 | 1.92 |

Experimental Example 2

The artificial marble samples of Examples 1 to 8 and Comparative Examples 1 to 12 were illuminated with a backlight from behind the samples and observed in front of the samples with the naked eye. In this case, for the artificial marble samples, a sample with a width of 7 cm, a length of 7 cm and a thickness of 1.5 cm was used. The backlight illuminated the sample with 60 lumens of light in a state of being in contact with the artificial marble, and the LED backlight of the smartphone (Samsung Galaxy S7) was used as the light source.

Then, the luminance was measured at a height of about 5 cm above the surface of the artificial marble by using the luminance meter (Luminance Meter LS-160 available from Konica Minolta).

As a result, all of the artificial marble samples of Examples 1 to 6 showed excellent luminance, exceeding 1000 cd/m$^2$. All of the Comparative Examples showed low luminance, and the artificial marbles of Examples 7 and 8 appeared greenish or bluish, and therefore, showed a relatively low product quality (Table 3).

In addition, for the artificial marble sample of Example 1, the light was seen to strongly transmit even from the front. On the other hand, for the artificial marble sample of Comparative Example 1, the light was scattered, so that a boundary was seen blurry. This was determined to be due to the difference in light transmittance according to the artificial marble samples. FIG. 1 is a photograph showing what is seen from the front when an artificial marble sample of Example 1 is illuminated from behind with a backlight. FIG. 2 is a photograph showing what is seen from the front when an artificial marble sample of Comparative Example 1 is illuminated from behind with a backlight.

TABLE 3

|  | Luminance (cd/m$^2$) |
|---|---|
| Example 1 | 1250 |
| Example 2 | 1411 |
| Example 3 | 1204 |
| Example 4 | 1013 |
| Example 5 | 1402 |
| Example 6 | 1004 |
| Comparative Example 1 | 165 |
| Comparative Example 2 | 320 |
| Comparative Example 3 | 150 |
| Comparative Example 4 | 210 |
| Comparative Example 5 | 203 |
| Comparative Example 6 | 181 |
| Example 7 | 992 |
| Example 8 | 827 |
| Comparative Example 7 | 279 |
| Comparative Example 8 | 251 |
| Comparative Example 9 | 142 |
| Comparative Example 10 | 101 |
| Comparative Example 11 | 83 |
| Comparative Example 12 | 72 |

Experimental Example 3

An X-ray scan was performed for the artificial marble samples of Examples 1 to 3.

The imaging result of the X-ray scan is shown in FIG. 3. In the case of the artificial marble of Example 2 including the highly transparent amorphous glass particles containing the barium element, it was confirmed that the artificial marble appeared bluish as a result of X-ray imaging. However, it was confirmed that the artificial marbles of Examples 1 and 3 not containing glass particles appeared greenish as a result of X-ray imaging.

The invention claimed is:

1. An artificial marble comprising a binder resin, inorganic particles and quartz powder,
    wherein the quartz powder has a SiO$_2$ content of 99.5 to 100% by weight and an alumina content of 0.5% by weight or less,
    wherein the artificial marble comprises 550 to 650 parts by weight of the inorganic particles and 250 to 350 parts by weight of the quartz powder on the basis of 100 parts by weight of the binder resin, and
    wherein the artificial marble has a total transmittance of 6 or greater and 20 or less when the total transmittance is measured using a turbidimeter (NDH 5000 available from Nippon Denshoku) for an artificial marble sample with a size of 7 cm in width, 7 cm in length, and 1.5 cm in thickness.

2. The artificial marble of claim 1, wherein the artificial marble has a luminance of 400 cd/m$^2$ or greater and 2000 cd/m$^2$ or less when an artificial marble sample with a size of 7 cm in width, 7 cm in length, and 1.5 cm in thickness is illuminated with 60 lumens of light from a backlight in contact with the artificial marble sample and the luminance is measured at a height of about 5 cm above a surface of the artificial marble sample by using a luminance meter (Luminance Meter LS-160 available from Konica Minolta), on a side of the artificial marble sample opposite to a side in contact with the backlight.

3. The artificial marble of claim 1, wherein the quartz powder has a SiO$_2$ content of 99.6 to 100% by weight.

4. The artificial marble of claim 1, wherein the quartz powder has an average SiO$_2$ content of 99.7 to 100% by weight.

5. The artificial marble of claim 1, wherein the inorganic particles comprise one or more selected from the group consisting of amorphous silica particles, glass particles including a barium element, crystalline quartz particles, and fused silica particles.

6. The artificial marble of claim 1, wherein the binder resin comprises 90% by weight or more of an unsaturated polyester resin, and the unsaturated polyester resin is manufactured using a composition comprising an unsaturated polyester polymer and a vinyl-based monomer in a weight ratio of 100:30 to 70.

7. The artificial marble of claim 1, wherein the inorganic particles are amorphous silica particles or crystalline quartz particles, and the inorganic particles are inorganic particles having a SiO$_2$ content of 99.5% by weight or more and 100% by weight or less.

8. The artificial marble of claim 1, wherein the inorganic particles are fused silica particles.

9. The artificial marble of claim 1, wherein the inorganic particles are glass particles including a barium element.

10. The artificial marble of claim 8, wherein the glass particles have a barium (Ba) element content of 10% by weight or more and 35% by weight or less on the basis of 100% by weight of the glass particles.

11. The artificial marble of claim 8, wherein the glass particles have a barium (Ba) element content of 15% by weight or more and 25% by weight or less on the basis of 100% by weight of the glass particles.

12. The artificial marble of claim 8, wherein the glass particles have a barium (Ba) element content of 5% by weight or more and 25% by weight or less on the basis of 100% by weight of the artificial marble.

13. The artificial marble of claim 8, wherein the glass particles have a barium (Ba) element content of 10% by weight or more and 15% by weight or less on the basis of 100% by weight of the artificial marble.

14. An artificial marble comprising 550 to 650 parts by weight of inorganic particles and 250 to 350 parts by weight of quartz powder on the basis of 100 parts by weight of a binder resin,
  wherein the binder resin comprises an unsaturated polyester resin, and
  wherein the inorganic particles comprise one or more selected from the group consisting of amorphous silica particles, glass particles including a barium element, crystalline quartz particles, and fused silica particles, and
  wherein a region in which the quartz powder has a $SiO_2$ content of 99.5% by weight or more and 100% by weight or less is included.

* * * * *